Aug. 6, 1946.     H. W. SHERIDAN     2,405,333
TWO-SPEED PARACHUTE
Filed Aug. 6, 1942
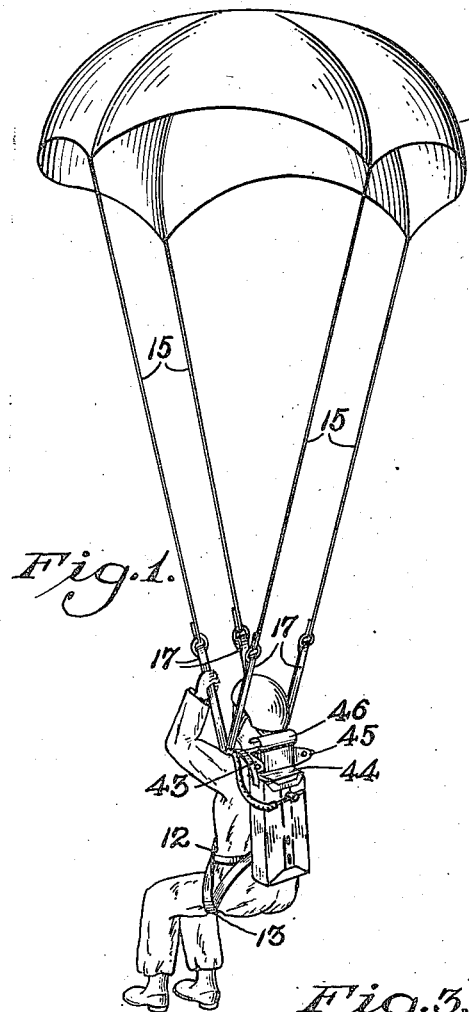
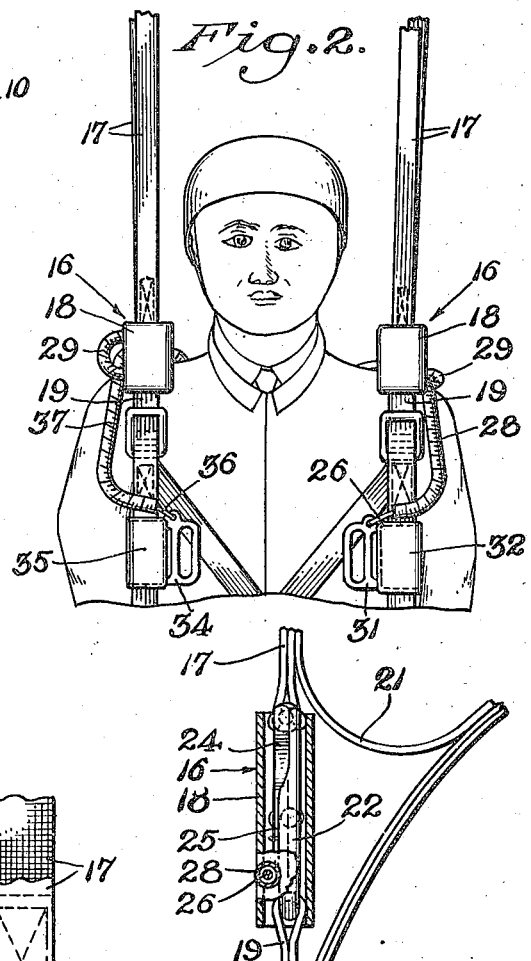
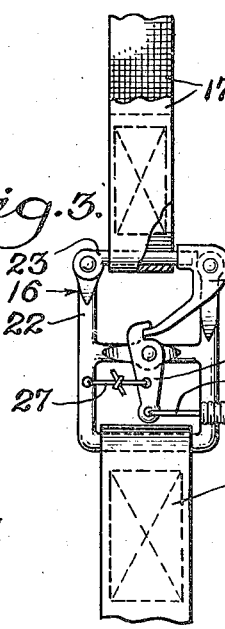
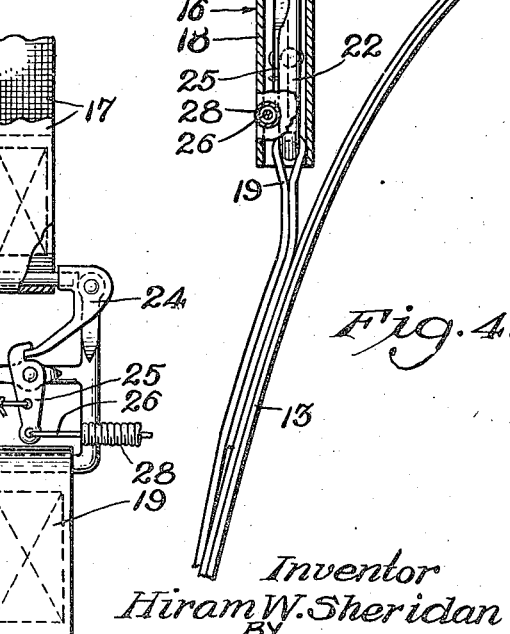
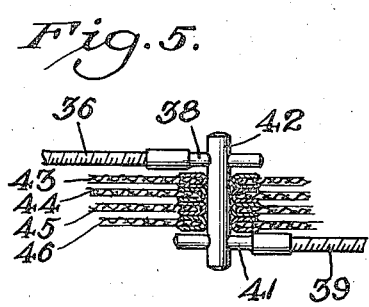
Inventor
Hiram W. Sheridan
BY
Mann, Brown & Co.
Attorneys.

Patented Aug. 6, 1946

2,405,333

UNITED STATES PATENT OFFICE 2,405,333

TWO-SPEED PARACHUTE

Hiram W. Sheridan, Oak Park, Ill.

Application August 6, 1942, Serial No. 453,766

3 Claims. (Cl. 244—151)

This invention relates to parachutes for aviators who may be forced to leave a disabled plane and for troops who are to land from a troop-carrying plane by parachute.

At the present time, the parachutes used for the above purposes are simple parachutes which lower the personnel at a rate which is slow enough to prevent injury on reaching the ground. In the case of a pilot escaping from a disabled airplane, the pilot hanging in the air below his slowly descending parachute offers an excellent target to gun fire from enemy airplanes, and many pilots have been killed in the present war in these circumstances. Parachute troops being dropped from an airplane face a similar danger. If they are dropped from any height, they remain in the air for a considerable period of time and offer excellent targets to ground troops equipped with rifles and machine guns. For this reason it has become the practice to drop parachute troops from airplanes flying as low as two or three hundred feet above the ground in spite of the fact that this greatly increases the chance of the troop-carrying plane itself being shot down by fire from the ground.

It has been suggested that pilots and parachute troops descending by parachute should refrain from opening their parachutes until they are within a few hundred feet from the ground, but it has not proved practical to train troops or pilots to do this. In the excitement of leaving a plane, a man's first thought is to arrest his speedy fall, and very few pilots or soldiers are able to refrain from opening their parachute as soon as possible.

The principal object of this invention is to provide a two-speed parachute so that an airman or soldier dropping from an airplane can immediately check his fall to a speed of 50 or 60 miles an hour and descend at this speed to within a few hundred feet of the ground, and then, when he is close to the ground, decrease his speed of descent enough so that he will land without injury.

The principal feature of this invention is the provision of a parachute arrangement having two canopies, one small and one large, and an arrangement which permits the small canopy to be released to slow the airman or soldier down to a speed of about 50 or 60 miles an hour and then permits the large canopy to be released to slow him down to a speed of 15 or 20 feet a second.

These and other objects and features of the invention will be clear from the following description and claims and the accompanying drawing, in which Fig. 1 is a view of a soldier using one of the preferred forms of the invention;

Fig. 2 is a view of a portion of the harness forming a portion of the invention;

Fig. 3 is a view of a detail of the harness shown in Fig. 2;

Fig. 4 is a side view of a portion of the harness shown in Fig. 2; and

Fig. 5 is a cross section through a portion of the parachute pack.

The embodiment of the invention shown in the drawing comprises two separate parachute canopies, one small canopy 10 and one large canopy, which is in the pack 11, and both canopies are connected to a single harness 12. The main portion of the harness 12 is substantially the same as a conventional parachute harness and includes main risers 13 extending under the seat of the parachutist, up at either side of the chest, over the shoulders, and back to the main canopy in the pack 11. The pack 11 is substantially the same as the pack of a conventional back-pack type of parachute, and the main canopy together with its shroud lines is packed in the pack 11 in the conventional manner. However, the pack 11 does not contain a pilot chute or canopy, the function of the pilot chute being performed by the small canopy 10.

The small canopy 10 may be from 3 to 6 feet in diameter and is provided with four shroud lines 15 which are secured to small risers 17. The lower ends of the risers 17 are connected through latch mechanisms 16 housed in latch boxes 18 to branch risers 19, sewn to the main risers 13 just below the shoulders. Thus, the strain from the shroud lines 15 of the small canopy 10 is transferred to the main risers 13.

Although a single shroud line with branches to different sides of the canopy would be sufficiently strong to carry the pull of the small canopy, and could be used, four shroud lines 15 are provided in the form of the invention illustrated in order that the parachutist may steer himself in his fall by pulling on some of the shroud lines and causing the entrapped air to escape from the small canopy on one side or the other as may be necessary to cause the parachute to drift in the desired direction.

A small pack 19 is provided on the back of the parachutist just above the main pack 11 for containing the small canopy 10 and its shroud lines 15 when they are not in use. When the small canopy 10 is in its pack 19 the small canopy risers 17 lead back over the shoulders of the parachutist and into the small pack 19. With this arrangement, the small canopy risers 17 snap up at either side of the head of the parachutist when the small canopy catches the air, and the parachutist is suspended comfortably from the main risers 13 just as when he is carried by the large canopy.

The small canopy 10 is connected to the main canopy in the main pack 11 through a pair of main chute opening straps 21 which are sewn to the lower ends of the small canopy riser 17 and extend back into the main pack 11. In the main pack 11 the opening straps 21 are connected first to the locking pins which secure the cover of the pack 11 in its closed position and then to the apex of the main canopy, so that, when the opening straps 21 are pulled, they will first release the cover of the main pack 11 and then draw out the large canopy and its shroud lines in the same manner as is done by a conventional pilot chute.

The small canopy 10 is released from its connection to the main riser 17 through the operation of a latch mechanism contained within the latch box 18. As may be seen from Fig. 3, the latch mechanism housed in the latch box 18 comprises a yoke 22 secured in the loop of the branch riser 19 and having a releasable connection to the small canopy riser 17 at its upper end. The releasable connection consists of a latch 23 pivoted to one end of the yoke and held in place by a keeper 24 pivoted to the other end of the yoke.

The end of the keeper which holds the latch is formed with a socket or recess into which the end of the latch fits and from which it can slide easily when the keeper swings up. The keeper 24, in turn, is held by a trigger 25 pivoted on a portion of the yoke and operated by a release cord 26. To prevent accidental operation of the latch mechanism, a safety cord 27 is provided and ties the trigger 25 in its closed position. The safety cord 27 is weak enough so that it will break readily when the parachutist desires to release the latch and pulls upon the release cord 26.

The release cords 26 from the two latch mechanisms lead through flexible housings or tubes 28 and 29 to a conventional D-ring 31 releasably mounted in a pocket 32 on the harness, so that, when the D-ring 31 is pulled by the parachutist, the release cords 26 will be pulled and the latches 16 will be opened. This releases the small canopy 10 from its connection to the main risers 13, permitting it to pull on the main chute opening straps 21 and release the main chute from its pack 11.

The initial release of the small canopy 10 from its pack 19 is effected through means similar to those employed on conventional parachutes. This means consists of a D-ring 34 releasably carried in a pocket 35 secured to the harness and connected to a release cord 36 which extends through a flexible housing or tube 37 to the release pins 38 which hold the small canopy pack 19 closed. The parachutist is thus provided with two D-rings 31 and 34, one of which, 34, serves to release the small canopy 10 and the other 31 serves to disconnect the small canopy 10 from the harness 12 and cause it to release the main canopy.

The D-ring 31 which serves to disconnect the small canopy 10 from the harness 12 is also connected to the pack 19 for the small canopy so that, when it is pulled, it will release the small canopy from its pack 19 if it happens to still be in its pack. Thus, if the parachutist desires to release the main canopy immediately, he merely pulls the main canopy D-ring 31 and the small canopy 10 is simultaneously released from its pack 19 and disconnected from the main risers 13 so that it can immediately function as a pilot chute and draw out the main chute. The mechanism which permits this to be done comprises an additional release cord 39 branching off from the main cord 26 connected to the main canopy D-ring 31 and leading to a release pin 41 engaging one end of the locking pin or stud 42 of the pack 19 for the small canopy. The other end of the stud 42 is engaged by the release pin 38, so that, when either of the release pins 38 or 41 is withdrawn by pulling on either of the D-rings 31 and 34, the flaps 43, 44, 45 and 46 of the small pack 19 will be released. This opens the small pack, permitting the small canopy, which is provided with conventional spring opening means such as is customarily used on pilot chutes, to open.

While I have shown and described only one specific embodiment of my invention, it will, of course, be understood that many other embodiments may be devised. For example, the small canopy may be packed in a small chest or lap pack instead of in a back pack and the large or main canopy may be packed in any of the conventional types of packs, such as a lap pack, a chest pack, a back pack or a seat pack. If the small canopy is packed in a chest or lap pack, it may have its risers leading to a single latch mechanism on the chest, the latch mechanism being connected to the main risers by branch risers extending diagonally down and fastened to the main risers near the waist of the parachutist and being held in against the chest of the parachutist by straps extending over the shoulders and across the back and buckled to the main risers at the shoulders. In such a harness, one of the branch risers and one of the shoulder straps would be provided with buckles or releasable connections to facilitate the putting on of the harness.

I claim:

1. In a parachute apparatus, a harness including at least two risers for supporting the weight of a parachutist, a large canopy connected directly to said risers, means for holding said large canopy from opening, latch mechanisms corresponding to and connected to each of said risers, a small canopy connected to said risers through said latch mechanisms, respectively, said latch mechanisms being normally and inherently effective to resist the pull of said small canopy, means connected to said small canopy and automatically operated thereby for releasing said large canopy holding means, and means for simultaneously releasing said latch mechanisms.

2. In a parachute apparatus, a harness including risers for supporting the weight of a parachutist, two canopies normally positively connected directly to said risers, means for disconnecting one of said canopies from said risers, and means operated by one of said canopies for releasing the other canopy.

3. In a parachute apparatus, a harness including risers for supporting the weight of a parachutist, a large canopy connected directly to said risers, normally closed positive latch means corresponding to and connected to said risers, respectively, a small canopy connected to said risers through said latch means, means for instantaneously releasing said latch means, and means operated automatically by said small canopy for releasing said large canopy.

HIRAM W. SHERIDAN.